US007110934B2

(12) United States Patent
Berent et al.

(10) Patent No.: US 7,110,934 B2
(45) Date of Patent: Sep. 19, 2006

(54) ANALYSIS OF THE PERFORMANCE OF A PORTION OF A DATA PROCESSING SYSTEM

(75) Inventors: Anthony Neil Berent, Stapleford (GB); Paul Frederick D'Souza, Burlington (CA)

(73) Assignee: ARM Limited., Cambridge (GB)

( * ) Notice: Subject to any disclaimer, the term of this patent is extended or adjusted under 35 U.S.C. 154(b) by 686 days.

(21) Appl. No.: 10/282,225

(22) Filed: Oct. 29, 2002

(65) Prior Publication Data

US 2004/0083088 A1    Apr. 29, 2004

(51) Int. Cl.
    G06G 7/62    (2006.01)
(52) U.S. Cl. .......................................... 703/17; 717/128
(58) Field of Classification Search ................... 703/19, 703/22, 21, 17; 717/135, 128; 706/920
    See application file for complete search history.

(56) References Cited

U.S. PATENT DOCUMENTS

| 5,140,537 | A | * | 8/1992 | Tullis ............................. 703/6 |
| 5,960,199 | A | * | 9/1999 | Brodsky et al. ............. 717/128 |
| 6,059,835 | A | * | 5/2000 | Bose ........................... 703/19 |
| 6,363,509 | B1 | * | 3/2002 | Parulkar et al. ............ 714/738 |
| 6,804,636 | B1 | * | 10/2004 | Senta et al. ................... 703/13 |

OTHER PUBLICATIONS

ARM Limited; "ETM7 (Rev 1), Technical Reference Manual;" copyright © 2000, 2001.
ARM Limited; "ETM7 (Rev 1), Technical Reference Manual—ARM DDI 0158D; Errata 01;" copyright © 2002.
ARM Limited; "ARM Software Development Toolkit, Version 2.50, User Guide;" copyright © 1997 and 1998.

\* cited by examiner

*Primary Examiner*—Albert W. Paladini
(74) *Attorney, Agent, or Firm*—Nixon & Vanderhye P.C.

(57) ABSTRACT

The present invention provides a system and method for controlling a simulator to run a software simulation of a data processing system in order to generate simulated timing data indicative of performance of an unmodelled portion of the data processing system not modelled by the software simulation. The software simulation provides a timing accurate model of those parts of the data processing system other than the unmodelled portion. The method of the invention comprises inputting to a controller of the simulator real trace data obtained from execution of a program by the data processing system, the real trace data identifying the sequence of instructions executed by the data processing system, and associated timing data. The method then involves running the software simulation under the control of the controller, the controller determining from the real trace data the sequence of instructions executed by the data processing system and controlling the software simulation to ensure that the same sequence of instructions is executed within the software simulation. Then simulated timing data is generated resulting from execution of the sequence of instructions within the software simulation, whereby the performance of the unmodelled portion of the data processing system is derivable from a comparison of the real trace data and the simulated timing data. This technique provides a particularly efficient technique for obtaining performance information about a portion of a data processing system which is not modelled within a software simulation.

38 Claims, 4 Drawing Sheets

| INST$^N$ | REAL CYCLE COUNT | REAL CYCLES | SIMULATED CYCLE COUNT | SIMULATED CYCLES | MEMORY LOST |
|---|---|---|---|---|---|
| 0x 8000 LDR... | 10 | | 14 | | |
| ⋮ | 15 | 5 | 17 | 3 | 2 |
| ⋮ | 17 | 2 | 19 | 2 | 0 |
| ⋮ | 22 | 5 | 21 | 2 | 3 |
| ⋮ | 25 | 3 | 23 | 2 | 1 |
| ⋮ | 30 | 5 | 27 | 4 | 1 |
| EXCEPTION | 60 | 30 | 31 | X | X |
| ⋮ | 65 | 5 | 33 | 2 | 3 |

FIG. 4

ANALYSIS OF THE PERFORMANCE OF A PORTION OF A DATA PROCESSING SYSTEM

BACKGROUND OF THE INVENTION

1. Field of the Invention

The present invention relates to a system and method for facilitating analysis of the performance of a portion of a data processing system.

2. Description of the Prior Art

It is known to trace the activity of a data processing system in order to obtain data representing activities of the data processing system that are desired to be monitored. Tracing mechanisms to produce trace streams of data representing such activities of the data processing system may be provided externally to the chip containing the processor core of the data processing system, or on-chip. However, with the general move towards more deeply embedded processor cores, it becomes more difficult to track the state of the processor core via externally accessible pins, and accordingly increased amounts of tracing functionality are being placed on-chip. An example of such on-chip tracing mechanisms is the Embedded Trace Macrocell (ETM) provided by ARM Limited, Cambridge, England, in association with various of their ARM processors.

Such tracing mechanisms produce in real time a trace stream of data representing activities of the data processing system that are desired to be traced, and such trace streams can provide accurate information about the performance of the data processing system. The trace stream can, for example, provide information about how long the processor core took to execute each instruction. However, what it cannot do, in general, is give an explanation of the source of any delays in the data processing system giving rise to performance problems.

An alternative technique for analysing the performance of a data processing system is to build a software simulation of the data processing system, using a simulator, for example the "ARMulator" product produced by ARM Limited. The running of such a software simulation can give very detailed information about the data processing system, but it is difficult to build an accurate simulation of a complete data processing system. In particular, unless the full behaviour of all components of the data processing system is known, building such an accurate simulation is impossible. Even if all components are fully understood, the work involved in building such a software simulation of a real data processing system is considerable.

It is an object of the present invention to provide a technique for facilitating the derivation of performance information for a portion of a data processing system, so as to enable a better understanding of the source of delays in the data processing system.

SUMMARY OF THE INVENTION

Viewed from a first aspect, the present invention provides a method of controlling a simulator to run a software simulation of a data processing system to generate simulated timing data indicative of performance of an unmodelled portion of the data processing system not modelled by the software simulation, the software simulation providing a timing accurate model of those parts of the data processing system other than said unmodelled portion, the method comprising: inputting to a controller of the simulator real trace data obtained from execution of a program by the data processing system, the real trace data identifying the sequence of instructions executed by the data processing system and associated timing data; running the software simulation under the control of the controller, the controller determining from the real trace data the sequence of instructions executed by the data processing system and controlling the software simulation to ensure that the same sequence of instructions is executed within the software simulation; generating simulated timing data resulting from execution of said sequence of instructions within the software simulation; whereby the performance of said unmodelled portion of the data processing system is derivable from a comparison of the real trace data and the simulated timing data.

In accordance with the present invention, use is made of a software simulation of a data processing system that does not fully model the real data processing system, in order to generate simulated timing data indicative of performance of an unmodelled portion of the data processing system. The software simulation provides a timing accurate model of those parts of the data processing system other than the unmodelled portion. The method of the present invention involves inputting to a controller of the simulator real trace data obtained from execution of a program by the real data processing system, and then running that same program within the software simulation under the control of the controller. The controller is arranged to determine from the real trace data the sequence of instructions executed by the real data processing system, and then to control the software simulation to ensure that the same sequence of instructions is executed within the software simulation.

By this approach, it can be ensured that even though a portion of the data processing system has not been modelled, the portions of the data processing system that are modelled will behave as if the rest of the data processing system had been modelled with a behaviour accurate model. The method then involves generating simulated timing data resulting from execution of the sequence of instructions within the software simulation. Since the software simulation has accurately portrayed the behaviour of the data processing system, then any differences between the simulated timing data and the real timing data provided within the real trace data can be considered as resulting from the unmodelled portion of the data processing system. Accordingly, the performance of the unmodelled portion of the data processing system is derivable from a comparison of the real trace data and the simulated timing data.

It will be appreciated by those skilled in the art that there are a number of ways in which the software simulation can be run. However, in preferred embodiments, the running of the software simulation involves stepping through the sequence of instructions one instruction at a time.

To ensure that the software simulation is behaviour accurate, it is important to ensure that if there are any conditional instructions in the instruction sequence, they are handled in exactly the same way as they are handled when the program is executed on the real data processing system. In preferred embodiments, this is achieved by arranging said running step to further comprise, for each conditional instruction in the instruction sequence, the steps of: determining within the controller with reference to the real trace data whether that instruction was executed by the data processing system; and setting internal state within the software simulation to ensure that the conditional instruction is processed in the same manner within the software simulation. In preferred embodiments, the internal state set is the state of condition code flags within the software simulation. In such preferred embodiments, there is no requirement for the condition code flags to be set to exactly the same values as they would have been set to by the real data processing system, so long as they ensure that the conditional instruction is processed in the same manner as it was within the real data processing system (i.e. the condition code flags within the software simulation need to be set to ensure that the conditional instruction is either executed or not executed dependent on whether that instruction was executed or not executed by the real data processing system).

Another type of instruction which needs to be carefully handled to ensure that the software simulation is behaviour accurate is the branch instruction. It is clearly important to ensure that if a branch instruction as executed in the real data processing system resulted in the branch being taken, the target address for the branch is also the target address used by the software simulation when executing that branch instruction. Accordingly, in preferred embodiments, the running step further comprises, for a current instruction in the instruction sequence, the steps of: determining whether the preceding instruction in the sequence was a branch instruction; and if the preceding instruction in the sequence was a branch instruction, providing the software simulation with an indication of the address of the current instruction to ensure that the instruction processed within the software simulation following the branch instruction is the same instruction as executed by the data processing system.

Branch instructions can generally be classified as two types, namely direct branch instructions and indirect branch instructions. A direct branch instruction is one in which the target address of the branch is provided directly within the opcode of the branch instruction. In contrast, an indirect branch instruction is one in which the target address is not directly given within the opcode of the branch instruction, but rather is specified elsewhere, for example in a register that contains the branch address or contains data from which the branch address can be determined, in memory, etc. Since the contents of registers/memory at any particular point in time will be dependent on the overall state of the data processing system, and that overall state will not typically be accurately modelled within the software simulation, the software simulation cannot be relied on to accurately branch to the same address as the real data processing system branched to when executing a particular indirect branch instruction. However, the same problem does not typically arise when handling direct branch instructions, since in that instance the software simulation will typically be able to accurately determine the target address from the branch instruction itself.

Accordingly, in preferred embodiments, the step of determining whether the preceding instruction in the sequence was a branch instruction comprises determining whether the preceding instruction in the sequence was an indirect branch instruction, the step of providing the software simulation with an indication of the address of the current instruction only taking place if the preceding instruction was an indirect branch instruction.

Another situation where care is needed to ensure that the software simulation is behaviour accurate, is the situation where an exception occurs during execution of an instruction. Accordingly, in preferred embodiments, the running step further comprises, for each instruction in the instruction sequence, the steps of: determining within the controller with reference to the real trace data whether an exception occurred during execution of that instruction; and if an exception did occur, providing the software simulation with an indication of the address of the exception handling code executed by the data processing system to ensure that that exception handling code is processed within the software simulation. This step is required in preferred embodiments, since, due to the fact that the software simulation does not accurately model the entire state of the data processing system, it cannot be guaranteed that an exception would naturally occur during execution of any particular instruction within the software simulation, and accordingly a more robust way to ensure behaviour accurate processing within the software simulation is to identify such exceptions directly to the software simulation based on a review of the real trace data by the simulator controller.

It is typically the case that when the real data processing system handles an exception, it changes its mode of operation. Accordingly, in preferred embodiments, the method further comprises the step of, if an exception did occur when an instruction was processed by the real data processing system, providing the software simulation with an indication of the mode of operation entered by the data processing system in order to execute the exception handling code, thereby ensuring that the same mode of operation is entered within the software simulation.

It will be appreciated by those skilled in the art that there are a number of ways in which the simulated timing data could be generated. However, in preferred embodiments, the method further comprises the step of outputting simulated timing data for each instruction that gave rise to the generation of timing data in the real trace data. This enables more ready comparison of the real trace data with the simulated timing data.

It will be appreciated by those skilled in the art that the software simulation may provide a model of any appropriate part of the data processing system. However, in one preferred embodiment, the software simulation is arranged to provide a model of a processor core of the data processing system. In another preferred embodiment, the software simulation is arranged to provide a model of components of a chip incorporating the processor core of the data processing system, the unmodelled portion being those components of the data processing system not provided on said chip. In both embodiments, the model is both behaviour accurate and timing accurate with respect to the components of the real data processing system represented by that model.

It will be appreciated that the unmodelled portion of the data processing system may comprise a variety of components. However, in preferred embodiments, the unmodelled portion comprises at least part of the memory system of the data processing system. In one particular preferred embodiment, the unmodelled portion comprises those components of the memory system not provided on a chip incorporating a processor core of the data processing apparatus. In such embodiments, the chip incorporating the processor core will be modelled within the software simulation.

In preferred embodiments, some replacement for the unmodelled portion of the data processing system is provided within the software simulation to enable full processing of the sequence of instructions to take place. More particularly, in a preferred embodiment, a model of a single cycle memory system is incorporated within the software simulation in place of said unmodelled portion of the data processing system. Hence, with such a model incorporated into the software simulation, the software simulation provides a model of the data processing system, but with the unmodelled portion of the real data processing system's memory system replaced by a zero wait state memory. Since the performance of the modelled portion of the data processing system will be identical to the performance of that portion of the real data processing system, any difference between the simulated timing data and the real timing data will result from differences in the memory systems, i.e. the difference between the components of the real memory system, and the zero wait state memory system as modelled within the software simulation. Hence it is possible from this information to see where memory delays are significantly impacting the performance of the system. More particularly, the comparison of the real trace data and the simulated timing data preferably yields performance data which provides an indication of the source of delays in the data processing system, and in particular in the memory system.

It will be appreciated that both the real timing data and the simulated timing data can take a variety of forms. For example, the timing data could take the form of actual time information. However, in preferred embodiments, the timing data comprises cycle counts. These cycle counts may be expressed as absolute cycle counts, or as relative cycle counts, i.e. cycle counts between instructions.

In one embodiment of the present invention the controller may be arranged to extract the actual sequence of instructions from the real trace data and provide those sequence of instructions to the software simulation to ensure that the same sequence of instructions is executed within the software simulation. However, in preferred embodiments of the present invention, the software simulation is already provided with the program, and hence in preferred embodiments includes a ROM image of the code executed by the data processing system, with the same memory addresses. In this embodiment, the controller is arranged to monitor the sequence of instructions within the real trace data, and to send appropriate control signals to the software simulation as and when required to ensure that the same sequence of instructions of the program is executed within the software simulation.

Viewed from a second aspect, the present invention provides a method of analysing performance of a portion of a data processing system when a program is executed by the data processing system, the method comprising: receiving real trace data obtained from execution of said program by the data processing system, the real trace data identifying the sequence of instructions executed by the data processing system and associated timing data; receiving simulated timing data obtained by running said program within a software simulation of the data processing system, the software simulation including a behaviour accurate model of the data processing system and a timing accurate model of those parts of the data processing system other than said portion; and comparing the real trace data and the simulated timing data in order to determine the performance of said portion of the data processing system.

In accordance with this aspect of the present invention, the software simulation is arranged to include a behaviour accurate model of the entire data processing system, and a timing accurate model of those parts of the data processing system other than the portion whose performance needs to be analysed. Then, in accordance with this second aspect of the invention, the real trace data identifying the sequence of instructions executed by the data processing system and associated timing data is compared with simulated timing data obtained by running the same program within the software simulation, thereby enabling a determination of the performance of that portion of the data processing system.

Viewed from a third aspect, the present invention provides a simulation system for running a software simulation of a data processing system to generate simulated timing data indicative of performance of an unmodelled portion of the data processing system not modelled by the software simulation, the software simulation providing a timing accurate model of those parts of the data processing system other than said unmodelled portion, the simulation system comprising: a controller operable to receive real trace data obtained from execution of a program by the data processing system, the real trace data identifying the sequence of instructions executed by the data processing system and associated timing data; a simulation engine operable to run the software simulation under the control of the controller; the controller being operable to determine from the real trace data the sequence of instructions executed by the data processing system and to control the running of the software simulation to ensure that the same sequence of instructions is executed within the software simulation; the controller further being operable to cause generation of simulated timing data resulting from execution of said sequence of instructions within the software simulation; whereby the performance of said unmodelled portion of the data processing system is derivable from a comparison of the real trace data and the simulated timing data.

Viewed from a fourth aspect, the present invention provides an analyser system for analysing performance of a portion of a data processing system when a program is executed by the data processing system, the analyser system comprising: a first input for receiving real trace data obtained from execution of said program by the data processing system, the real trace data identifying the sequence of instructions executed by the data processing system and associated timing data; a second input for receiving simulated timing data obtained by running said program within a software simulation of the data processing system, the software simulation including a behaviour accurate model of the data processing system and a timing accurate model of those parts of the data processing system other than said portion; and comparison logic operable to compare the real trace data and the simulated timing data in order to determine the performance of said portion of the data processing system.

Viewed from a fifth aspect, the present invention provides a computer program product carrying a computer program operable to control a simulator to run a software simulation of a data processing system to generate simulated timing data in accordance with the method of the first aspect of the present invention.

Viewed from a sixth aspect, the present invention provides a computer program product carrying a computer program operable to control a computer to analyse performance of a portion of a data processing system in accordance with the method of the second aspect of the present invention.

The invention also relates to a carrier medium comprising such a computer program. The carrier medium may be any suitable device, for example a CD-ROM, a diskette, etc, or indeed may be a transmission medium such as optical fibre, a radio signal, etc.

BRIEF DESCRIPTION OF THE DRAWINGS

The present invention will be described further, by way of example only, with reference to a preferred embodiment thereof as illustrated in the accompanying drawings, in which.

DESCRIPTION OF A PREFERRED EMBODIMENT

Figure 1:
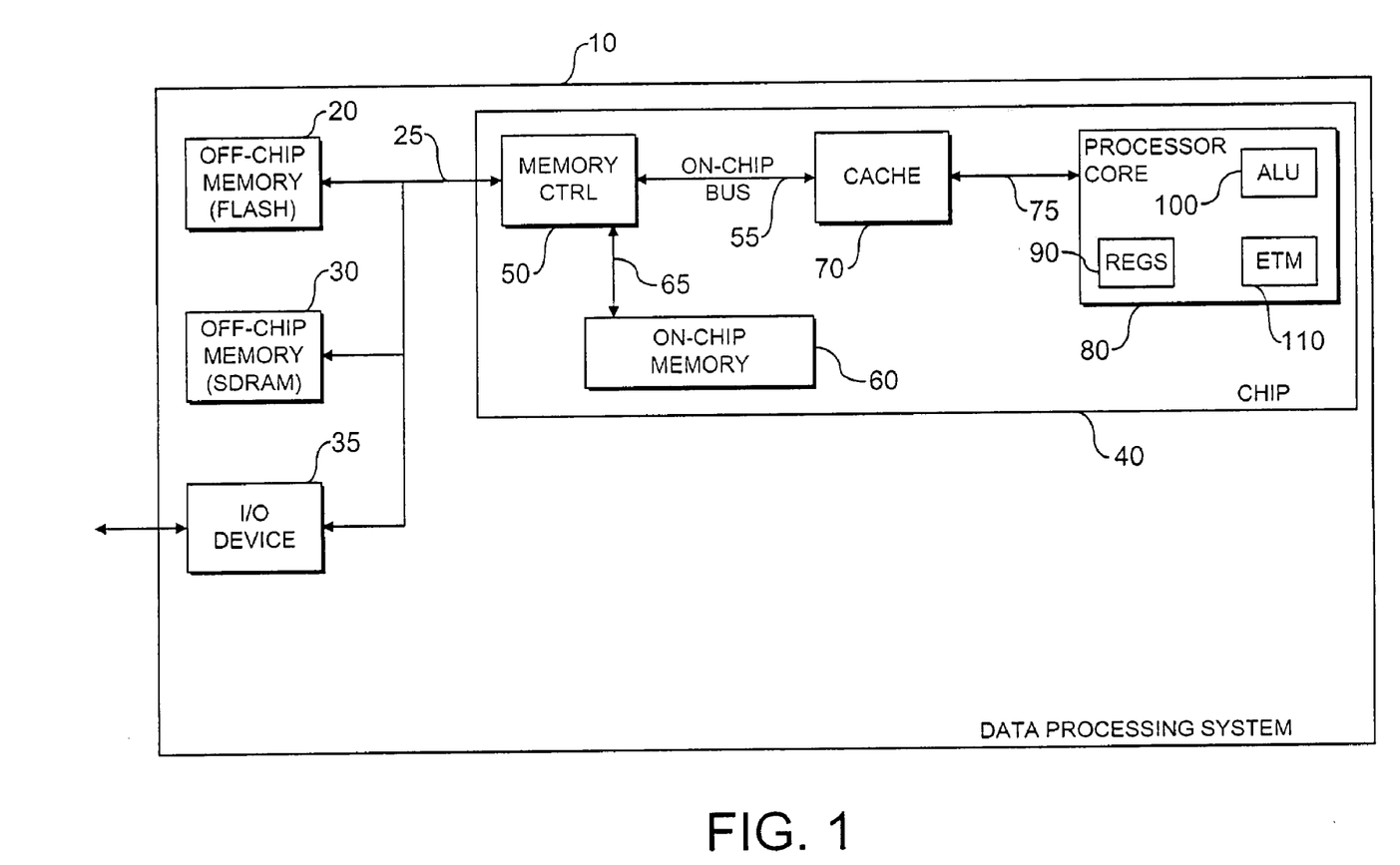
FIG. 1 is a block diagram showing relevant components of a data processing system with which the techniques of preferred embodiments of the present invention may be used to obtain performance information about a portion of that data processing system.

FIG. 1 is a block diagram illustrating relevant components of a data processing system with which techniques of the preferred embodiment of the present invention can be used to analyse the performance of the off-chip memory system of that data processing system.

The data processing system 10 includes a chip 40 incorporating a processor core 80. The processor core 80 includes an Arithmetic Logic Unit (ALU) 100 that is arranged to execute a sequence of instructions on data values stored within the registers of a register bank 90. When a data value is required by the processor core 80, a request for that data value is output over path 75 to the cache 70. Assuming the data value is within the cache, it is returned over path 75 to the processor core 80 whereupon it is stored within a register of the register bank 90. However, if the data value is not within the cache, then a request for that data value is passed via the on-chip bus 55 to the memory controller 50 to request retrieval of that data value from the relevant memory.

As can be seen from FIG. 1, a variety of different memories may be provided within the data processing system 10. For example one or more off-chip memory devices, such as flash memory 20 and SDRAM memory 30, may be provided externally to the chip, with the data stored within those memories being retrieved by the memory controller 50 via bus 25. Additionally, in certain embodiments, some on-chip memory 60 may be provided, which is typically significantly smaller than the off-chip memories, but provides faster access than is possible via the off-chip memories.

Accordingly, if the data value requested via the on-chip bus 55 is within the on-chip memory 60, the memory controller 50 retrieves that data value via the bus 65, whereas if the data value requested is stored within one of the off-chip memory devices 20, 30, the memory controller 50 retrieves that data value from the appropriate off-chip memory via the bus 25. Once the data value has been retrieved, it is returned via the on-chip bus 55 to the cache 70, from where it will be passed back to the processor core over path 75. Typically, the cache 70 will be arranged to store that data value so that it is subsequently available within the cache if later required by the processor core 80.

In addition to the above described memory devices, one or more other devices may be connected to bus 25, for example the input/output device 35 used for example to drive a serial port, LEDs, a screen, etc. Such an I/O device can be considered as part of the memory system, as typically a certain sequence of addresses will be reserved for communicating from the memory controller 50 to the I/O device 35, and vice versa, and hence the I/O device 35 is accessible in the same manner as the memory devices 20, 30.

The processor core 80 is also provided with an Embedded Trace Macrocell (ETM) 110 for generating trace signals indicative of the instructions being executed by the processor. ETMs are typically used in system development to generate trace streams including data representing the step-by-step activity within the system being traced. Due to the increased difficulty in tracking the state of the processor via externally accessible pins, increased amounts of tracing functionality are being placed on-chip, examples of such on-chip tracing mechanisms being the ETM provided by ARM Limited, Cambridge, England in association with various of their ARM processors.

The ETM is arranged to produce in real time a trace steam of data giving information enabling the complete sequence of instructions executed by the processor core to be determined, and providing timing data concerning those sequence of instructions. This trace stream will typically be output in some compressed form from the ETM 110 to a trace buffer, which may be provided within the data processing system 10 or externally to the data processing system 10. The trace buffer will then typically be arranged to decompress the trace stream in order to generate full instruction trace information along with associated timing data. In preferred embodiments, the timing data takes the form of cycle count information for each instruction. Further, in preferred embodiments, the full instruction trace information will include the addresses of the executed instructions, this enabling determination by the simulator of the target addresses for indirect branch instructions.

Figure 2:
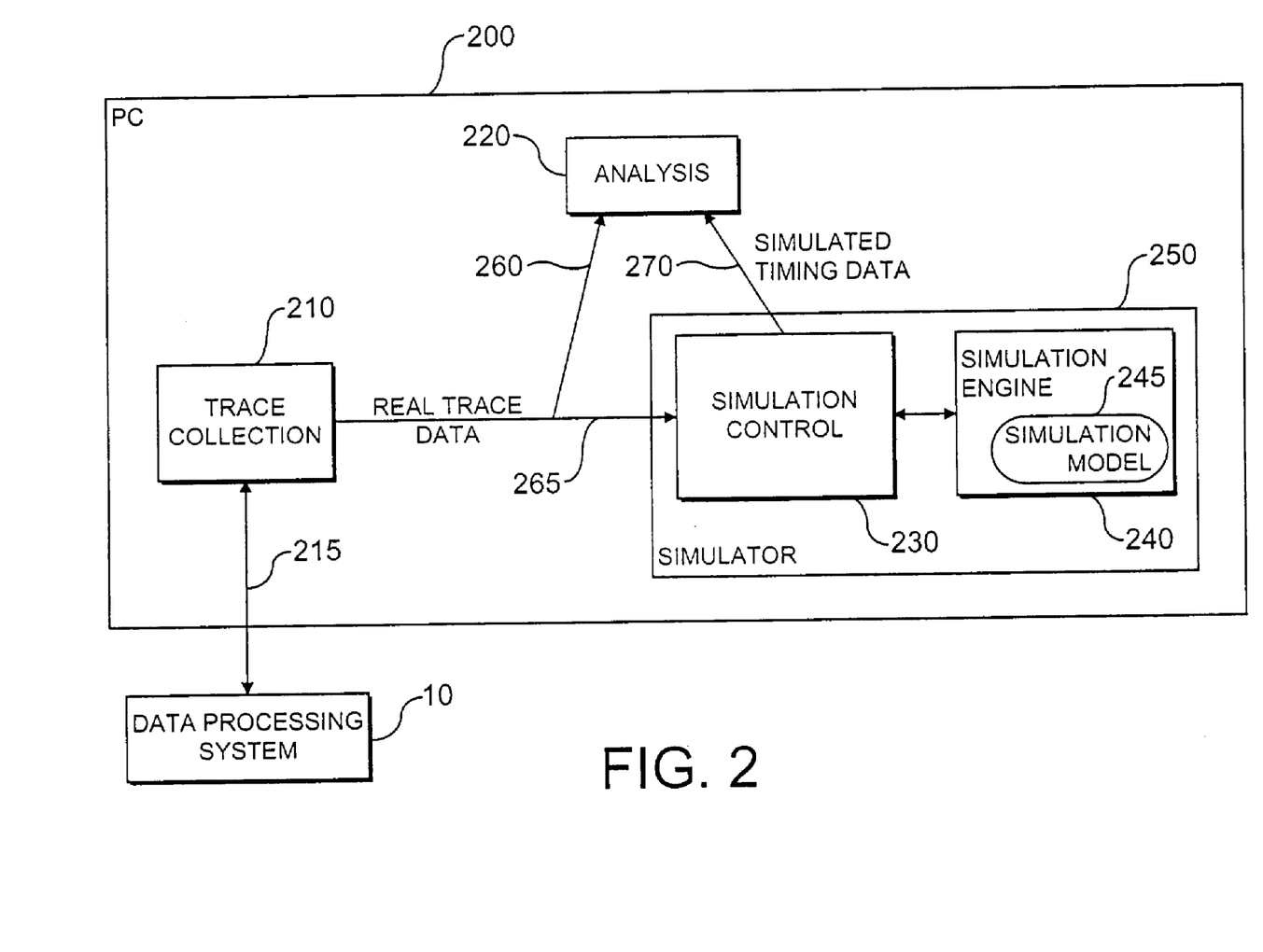
FIG. 2 is a block diagram schematically illustrating the processes performed in accordance with preferred embodiments of the present invention in order to generate simulated timing data indicative of performance of an unmodelled portion of the data processing system, and allow subsequent analysis of that performance.

FIG. 2 is a block diagram illustrating the functions performed within a computer system 200 to generate simulated timing data for the data processing system 10, and then to analyse the simulated timing data and the real trace data in order to determine the performance of a certain portion of that data processing system. As illustrated in FIG. 2, all of the functions are shown as being performed within a single computer system 200, in the particular example of FIG. 2, this computer system being a Personal Computer (PC). However, it will be appreciated by those skilled in the art that there is no requirement for all of these functions to be performed within a single computer, and hence, for example, the trace collection step could be performed in one computer, the simulation could be performed in another computer, and the analysis could be performed in a further computer.

As illustrated in FIG. 2, the trace stream generated by the ETM 110 of the data processing system 10 is output over path 215 to a trace collection process, which is arranged to decompress the trace stream in order to generate a full instruction trace with associated cycle count information and to then store that full instruction trace. Typically, this trace collection process will be performed by software running on the PC 200, for example the Trace Debug Tools developed by ARM Limited of Cambridge, England.

This decompressed trace stream, which relates to the trace generated by the real data processing system 10, and which hence will also be referred to herein as the "real trace data", is then output over path 265 to a simulator/simulation system 250, and over path 260 to an analysis function 220. The simulator 250 incorporates a simulation controller 230 which is arranged to control the running of a simulation engine 240. The simulation engine 240 is arranged to run a simulation model 245 (also referred to herein as a software simulation). The simulation model provides a timing accurate model of a certain portion of the data processing system 10, in preferred embodiments the simulation model 245 providing a timing accurate simulation of at least the processor core 80. The remainder of the data processing system is then unmodelled by the simulation model, and hence in the example that the simulation model contains an accurate model of the processor core 80, it can be seen that the unmodelled portion represents the memory system of the data processing system 10 illustrated in FIG. 1. In an alternative embodiment, the simulation model 245 contains a timing accurate model of the entire chip 40, and in this embodiment it can been seen that the unmodelled portion is that portion of the memory system provided off-chip.

Since some assumptions need to be made about the memory system within the simulation model in order for the simulation model to be able to execute a sequence of instructions, those unmodelled portions of the memory system are represented by a model of a single cycle memory, i.e. a memory with zero wait state. The simulation model is then in preferred embodiments provided with an exact ROM image of the program code executed by the data processing system 10, with the same memory addresses. However, even with this ROM image, it cannot be ensured that the simulation engine would naturally execute exactly the same sequence of instructions as was executed by the data processing system 10, since the simulation model 245 will not contain an accurate representation of the entire state of the data processing system as the program was run on the data processing system 10.

Accordingly, in accordance with preferred embodiments of the present invention, the simulation control block 230 is arranged to determine from the real trace data received over path 265 the sequence of instructions executed by the data processing system, and is arranged to control the running of the software simulation by the simulation engine 240 to ensure that exactly the same sequence of instructions is executed within the software simulation. In preferred embodiments, the simulation engine 240 is arranged to single step through the instructions with a cycle count being provided from the simulation engine 240 to the simulation control block 230 after each step. The simulation control block 230 is then arranged to produce simulated timing data incorporating that cycle count information, which is then issued over path 270 to the analysis block 220.

Figure 3:
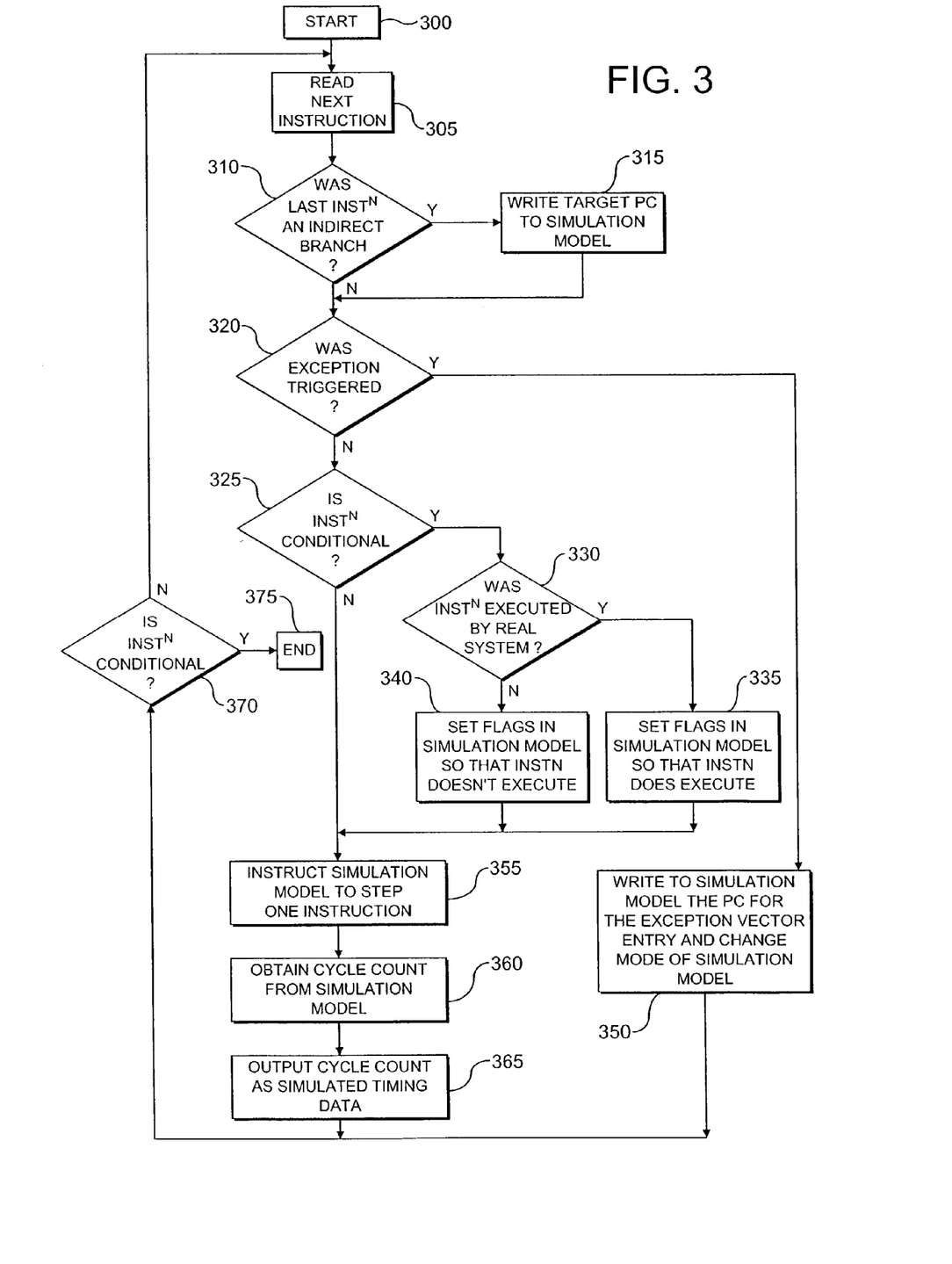
FIG. 3 is a flow diagram illustrating the process performed within the simulation control block of FIG. 2 in accordance with preferred embodiments of the present invention.

Further details of the operation of the simulation control block 230 will now be given with reference to the flow diagram of FIG. 3. The process starts at step 300, and proceeds to step 305 where the next instruction (on the first iteration the first instruction) is read by the simulation control block 230 from the real trace data obtained over path 265. Then, at step 310, it is determined whether the last instruction was an indirect branch instruction. On the first iteration, the first instruction is treated as though it were an indirect branch instruction. If the previous instruction was an indirect branch, then the process proceeds to step 315, where the target Program Counter (PC) (i.e. the target address) is written to the simulation model 245. This target address is the address of the instruction read at step 305, this information being provided within the real trace data received over path 265.

This needs to be done to ensure that the correct sequence of instructions is executed within the simulation model, since for indirect branch instructions the target address is not specified directly within the instruction itself, but is instead specified elsewhere, for example with reference to the contents of one or more registers. Since the simulation model does not have a complete understanding of the state of the data processing system, it cannot be guaranteed that the content of those registers within the simulation model will be the same as the content of those registers were within the data processing system 10 at the time the indirect branch instruction was executed. Accordingly, it is appropriate to write the target address directly to the simulation model to ensure that the indirect branch instruction is handled within the simulation model in exactly the same way as it was handled within the real data processing system.

Following the writing of the target PC to the simulation model at step 315, the process proceeds to step 320, or indeed proceeds directly to step 320 in the event that it is determined at step 310 that the last instruction was not an indirect branch instruction. At step 320, it is determined whether an exception was triggered during execution of the current instruction being reviewed by the simulation controller 230, this information being derivable from the real trace data received by the simulation controller 230 over path 265. If an exception was triggered, then the process branches to step 350, where the PC for the exception vector entry (i.e. the start address for the sub-routine used to handle the exception) is written to the simulation model 245. In addition, a signal is sent to the simulation model 245 to indicate the mode of operation of the processor 80 of the real data processing system that was used to handle the exception. Again, because the absolute state of the real data processing system is not accurately known by the simulation model 245 at any particular point in time, it cannot be guaranteed without any intervention by the simulation controller that the simulation model 245 would either trigger an exception when processing that instruction, or handle the exception in the same way as it was handled in the real data processing system. Accordingly, this is the reason why step 350 is invoked if it is determined that an exception was triggered during execution within the real data processing system of the instruction currently under review. Following step 350, the process proceeds to step 370, where it is determined whether the end of the instruction sequence has been reached. If so, the process ends at step 375, whereas otherwise the process returns to step 305 to read the next instruction.

If it is determined at step 320 that an exception was not triggered when executing the instruction, then the process proceeds to step 325, where it is determined whether the current instruction being reviewed is a conditional instruction, this being apparent from the opcode of the instruction. If the instruction is conditional, the simulation controller 230 is then arranged to determine at step 330 whether that instruction was executed by the real data processing system, this information being derivable from the real trace data received over path 265. If it was executed, then the process proceeds to step 335, where flags are caused to be set in the simulation model 245 so that the instruction does execute within the simulation model. Otherwise, the process proceeds to step 340, where flags are caused to be set in the simulation model so that the instruction doesn't execute within the simulation model 245. It is not a requirement in preferred embodiments that these flags are set to exactly the same state as the corresponding flags in the real data processing system 10 will have been set to, provided that they are set in such a way that they result in the condition codes either being met (in the instance of step 335) or not met (in the instance of step 340), thereby ensuring correct handling of that condition instruction within the simulation model 245.

After steps 340 or 335, the process proceeds to step 355, or indeed proceeds directly to step 355 from step 325 in the event that it is determined that the current instruction is not conditional. At step 355, the simulation controller 230 instructs the simulation model 245 to step one instruction. Typically, there will be a particular pipeline stage in the execution pipeline of the processor core 80 at which the ETM 110 is arranged to generate a trace signal indicating execution of an instruction which has reached that particular point in the pipeline. This may, for example, be one of the execute stages of the pipeline, or a final write back stage of the pipeline. When stepping one instruction, the simulation model is run from the point where the preceding instruction reached that predetermined pipeline stage until the current instruction reaches that predetermined pipeline stage, and hence for example if the simulation model was stopped when instruction x-1 reached a first execute stage of the pipeline, the process of stepping through instruction x will involve running the simulation model from that point until instruction x reaches that first execute stage of the pipeline.

Once this single stepping process has been performed, the process then proceeds to step 360, where the simulation controller 230 obtains a cycle count from the simulation engine 240. This cycle count may be an absolute cycle count value, or may be a relative value specified with reference to the point at which the stepping process of step 355 began. The simulation controller 230 is then arranged at step 365 to issue over path 270 to the analysis function 220 a cycle count associated with the instruction that has been stepped at step 355. Thereafter, the process proceeds to step 370, where it is determined whether the end of the instruction sequence has been reached. If so, the process then ends at step 375, whereas otherwise the process returns to step 305 to read the next instruction.

In preferred embodiments, the simulation system 250 will be provided by appropriate software components executing on the PC 200, and as an example may be provided by the ARMulator product developed by ARM Limited.

Figure 4:
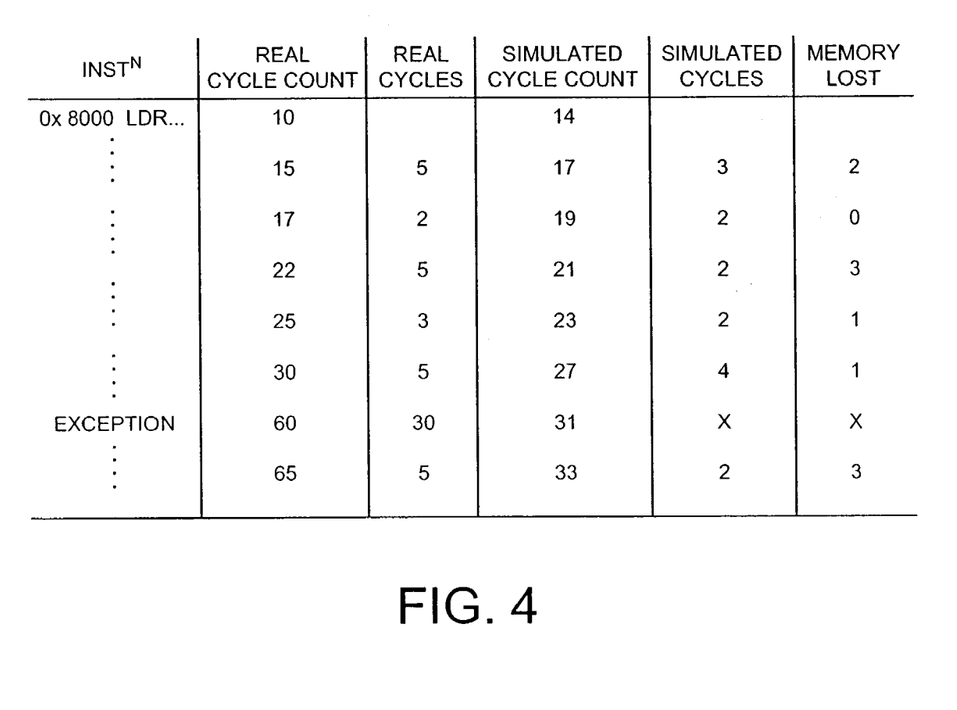
FIG. 4 is a table schematically illustrating the performance data which can be obtained by comparison of the real trace data and the simulated timing data in accordance with one embodiment of the present invention.

The analysis function 220 can take a variety of forms, and in one embodiment takes the form of an Excel spreadsheet with which are associated various macros and formulae arranged to populate the Excel spreadsheet with the simulated timing data received over path 270 and the real timing data received over path 260, and to then calculate differences between the corresponding cycle counts. An example of the type of spreadsheet which can be produced is illustrated in FIG. 4, where it can be seen that the instruction information is listed, along with the corresponding real cycle count from the real trace data and the simulated cycle count from the simulated timing data. In the example of FIG. 4, both the real cycle count and the simulated cycle count are expressed in absolute terms, and accordingly extra columns are provided to determine both the real cycles and the simulated cycles associated with each instruction. In this embodiment, no information can be determined about the first instruction, since it cannot be ensured that the absolute cycle counts were synchronised for both the real data processing system and the simulation model at the time the first instruction began execution.

As can be seen from FIG. 4, a final column provides an indication of the memory cost, this providing an indication of the delay incurred by the actual memory system of the real data processing system with respect to the ideal zero wait state memory modelled within the simulation model 245. This information then provides some indication as to the source of delays within the memory system of the real data processing system. Hence, as an example, this information might identify particular sections of code that seem to incur large delays in memory access. This may hence identify a section of code where undue "thrashing" is occurring, i.e. where data values are being moved back and forth between the memory system and the registers particularly often. One way of then reducing this memory cost might be to rewrite the relevant section of the code to ensure that the relevant data is retained within the cache for longer, to alleviate such thrashing of the memory system. Alternatively, the relevant instructions or data giving rise to the memory access delays could be moved to faster memory, such as the on-chip memory 60 of FIG. 1. It will be appreciated that the above description provides just a couple of examples of information which could be derived from such an analysis, and the steps that could be taken as a result of that analysis. However, it will be appreciated by those skilled in the art that there are many different ways in which such an analysis could be used.

Looking again at FIG. 4, it can be seen that no simulated cycle count is generated for the exception routine. This is due to the fact that the timing information obtained within the simulation model relating to such an exception is not useful for comparison with the real cycle count, as the simulation controller 230 is arranged on the identification of an exception occurring in the real data processing system, to provide the simulation model directly with the program counter for the exception vector entry, and hence the simulation model does not incur any time penalty in determining the presence of an exception and determining how to process the exception.

From the above description, it will be appreciated that the technique of preferred embodiments of the present invention provides a particularly efficient technique for obtaining information about the performance of a particular portion of a data processing system that it may not be possible or practical to model accurately within a software simulation. Furthermore, such analysis can prove to be a useful tool for obtaining performance data about a particular portion of a data processing system even when that portion can be modelled behaviour accurate, but not modelled timing accurate. In this instance, the analysis tool 220 is arranged to receive the real trace data, and the simulated timing data in the same manner, but in this instance the simulation controller 230 does not need to intervene in the processing of the simulation model within the simulation engine, due to the fact that the simulation model contains a behaviour accurate model of the entire data processing system.

Although a particular embodiment has been described herein, it will be apparent that the invention is not limited thereto, and that many modifications and additions thereto may be made within the scope of the invention. For example, various combinations of the features of the following dependent claims can be made with the features of the independent claims without departing from the scope of the present invention.

We claim:

1. A method of controlling a simulator to run a software simulation of a data processing system to generate simulated timing data, the software simulation providing a timing accurate model of parts of the data processing system other than an unmodelled portion of the data processing system not modelled by the software simulation, the method comprising:

inputting to a controller of the simulator real trace data obtained from execution of a program by the data processing system, the real trace data identifying the sequence of instructions executed by the data processing system and associated timing data;

running the software simulation under the control of the controller, the controller determining from the real trace data the sequence of instructions executed by the data processing system and controlling the software simulation to ensure that the same sequence of instructions is executed within the software simulation;

generating simulated timing data resulting from execution of said sequence of instructions within the software simulation;

whereby the performance of said unmodelled portion of the data processing system is derivable from a comparison of the real trace data and the simulated timing data.

2. A method as claimed in claim 1, wherein said running step comprises the step of:

stepping through said sequence of instructions one instruction at a time.

3. A method as claimed in claim 2, wherein said running step further comprises, for each conditional instruction in the instruction sequence, the steps of:

determining within the controller with reference to the real trace data whether that instruction was executed by the data processing system; and setting internal state within the software simulation to ensure that the conditional instruction is processed in the same manner within the software simulation.

4. A method as claimed in claim 2, wherein said running step further comprises, for a current instruction in the instruction sequence, the steps of:

determining whether the preceding instruction in the sequence was a branch instruction; and if the preceding instruction in the sequence was a branch instruction, providing the software simulation with an indication of the address of the current instruction to ensure that the instruction processed within the software simulation following the branch instruction is the same instruction as executed by the data processing system.

5. A method as claimed in claim 4, wherein said step of determining whether the preceding instruction in the sequence was a branch instruction comprises determining whether the preceding instruction in the sequence was an indirect branch instruction, the step of providing the software simulation with an indication of the address of the current instruction only taking place if the preceding instruction was an indirect branch instruction.

6. A method as claimed in claim 2, wherein said running step further comprises, for each instruction in the instruction sequence, the steps of:

determining within the controller with reference to the real trace data whether an exception occurred during execution of that instruction; and if an exception did occur, providing the software simulation with an indication of the address of the exception handling code executed by the data processing system to ensure that that exception handling code is processed within the software simulation.

7. A method as claimed in claim 6, further comprising the step of:

if an exception did occur when executing that instruction, providing the software simulation with an indication of the mode of operation entered by the data processing system in order to execute the exception handling code, thereby ensuring that the same mode of operation is entered within the software simulation.

8. A method as claimed in claim 2, further comprising the step of outputting simulated timing data for each instruction that gave rise to the generation of timing data in the real trace data.

9. A method as claimed in claim 1, wherein the software simulation is arranged to provide a model of a processor core of the data processing system.

10. A method as claimed in claim 9, wherein the software simulation is arranged to provide a model of components of a chip incorporating the processor core of the data processing system, the unmodelled portion being those components of the data processing system not provided on said chip.

11. A method as claimed in claim 1, wherein said unmodelled portion comprises at least part of the memory system of the data processing system.

12. A method as claimed in claim 11, wherein said unmodelled portion comprises those components of the memory system not provided on a chip incorporating a processor core of the data processing apparatus.

13. A method as claimed in claim 11, wherein a model of a single cycle memory system is incorporated within the software simulation in place of said unmodelled portion of the data processing system.

14. A method as claimed in claim 1, further comprising the step of:

comparing the real trace data and the simulated timing data in order to determine the performance of said unmodelled portion of the data processing system.

15. A method as claimed in claim 14, wherein the comparison step yields performance data which provides an indication of the source of delays in the data processing system.

16. A method as claimed in claim 1, wherein the timing data comprises cycle counts.

17. A method as claimed in claim 1, further comprising the step of providing the software simulation with said program.

18. A method of analysing performance of a portion of a data processing system when a program is executed by the data processing system, the method comprising:

receiving real trace data obtained from execution of said program by the data processing system, the real trace data identifying the sequence of instructions executed by the data processing system and associated timing data;

receiving simulated timing data obtained by running said program within a software simulation of the data processing system, the software simulation including a behaviour accurate model of the data processing system and a timing accurate model of those parts of the data processing system other than said portion; and comparing the real trace data and the simulated timing data in order to determine the performance of said portion of the data processing system.

19. A simulation system for running a software simulation of a data processing system to generate simulated timing data, the software simulation providing a timing accurate model of parts of the data processing system other than an unmodelled portion of the data processing system not modelled by the software simulation, the simulation system comprising:

a controller operable to receive real trace data obtained from execution of a program by the data processing system, the real trace data identifying the sequence of instructions executed by the data processing system and associated timing data;

a simulation engine operable to run the software simulation under the control of the controller;

the controller being operable to determine from the real trace data the sequence of instructions executed by the data processing system and to control the running of the software simulation to ensure that the same sequence of instructions is executed within the software simulation;

the controller further being operable to cause generation of simulated timing data resulting from execution of said sequence of instructions within the software simulation;

whereby the performance of said unmodelled portion of the data processing system is derivable from a comparison of the real trace data and the simulated timing data.

20. A simulation system as claimed in claim 19, wherein said controller is operable to cause the simulation engine to step through said sequence of instructions one instruction at a time.

21. A simulation system as claimed in claim 20, wherein said controller is operable, for each conditional instruction in the instruction sequence, to determine with reference to the real trace data whether that instruction was executed by the data processing system, and to cause the setting of internal state within the software simulation to ensure that the conditional instruction is processed in the same manner within the software simulation.

22. A simulation system as claimed in claim 20, wherein said controller is operable, for a current instruction in the instruction sequence, to determine whether the preceding instruction in the sequence was a branch instruction, and if so, to provide the software simulation with an indication of the address of the current instruction to ensure that the instruction processed within the software simulation following the branch instruction is the same instruction as executed by the data processing system.

23. A simulation system as claimed in claim 22, wherein said controller is operable to determine whether the preceding instruction in the sequence was an indirect branch instruction, and to only provide the software simulation with an indication of the address of the current instruction if the preceding instruction was an indirect branch instruction.

24. A simulation system as claimed in claim 20, wherein said controller is operable, for each instruction in the instruction sequence, to determine with reference to the real trace data whether an exception did occur during execution of that instruction and, if so, to provide the software simulation with an indication of the address of the exception handling code executed by the data processing system to ensure that that exception handling code is processed within the software simulation.

25. A simulation system as claimed in claim 24, wherein said controller is further operable, if an exception did occur during execution of that instruction, to provide the software simulation with an indication of the mode of operation entered by the data processing system in order to execute the exception handling code, thereby ensuring that the same mode of operation is entered within the software simulation.

26. A simulation system as claimed in claim 20, wherein the controller is operable to cause simulated timing data to be output for each instruction that gave rise to the generation of timing data in the real trace data.

27. A simulation system as claimed in claim 19, wherein the software simulation is arranged to provide a model of a processor core of the data processing system.

28. A simulation system as claimed in claim 27, wherein the software simulation is arranged to provide a model of components of a chip incorporating the processor core of the data processing system, the unmodelled portion being those components of the data processing system not provided on said chip.

29. A simulation system as claimed in claim 19, wherein said unmodelled portion comprises at least part of the memory system of the data processing system.

30. A simulation system as claimed in claim 29, wherein said unmodelled portion comprises those components of the memory system not provided on a chip incorporating a processor core of the data processing apparatus.

31. A simulation system as claimed in claim 29, wherein a model of a single cycle memory system is incorporated within the software simulation in place of said unmodelled portion of the data processing system.

32. A simulation system as claimed in claim 19, further comprising:

an analyser operable to compare the real trace data and the simulated timing data in order to determine the performance of said unmodelled portion of the data processing system.

33. A simulation system as claimed in claim 32, wherein the analyser is operable to generate performance data which provides an indication of the source of delays in the data processing system.

34. A simulation system as claimed in claim 19, wherein the timing data comprises cycle counts.

35. A simulation system as claimed in claim 19, wherein the software simulation is provided with said program.

36. An analyser system for analysing performance of a portion of a data processing system when a program is executed by the data processing system, the analyser system comprising:

a first input for receiving real trace data obtained from execution of said program by the data processing system, the real trace data identifying the sequence of instructions executed by the data processing system and associated timing data;

a second input for receiving simulated timing data obtained by running said program within a software simulation of the data processing system, the software simulation including a behaviour accurate model of the data processing system and a timing accurate model of those parts of the data processing system other than said portion;

comparison logic operable to compare the real trace data and the simulated timing data in order to determine the performance of said portion of the data processing system.

37. A computer program product carrying a computer program operable to control a simulator to run a software simulation of a data processing system to generate simulated timing data in accordance with the method of claim 1.

38. A computer program product carrying a computer program operable to control a computer to analyse performance of a portion of a data processing system in accordance with the method of claim 18.

* * * * *